United States Patent
Maurer et al.

(10) Patent No.: US 10,096,219 B1
(45) Date of Patent: Oct. 9, 2018

(54) OUTDOOR FURNITURE MONITORING

(71) Applicant: Alarm.com Incorporated, Tysons, VA (US)

(72) Inventors: Kevin Maurer, Tysons, VA (US); Alison Jane Slavin, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 15/836,168

(22) Filed: Dec. 8, 2017

Related U.S. Application Data

(60) Provisional application No. 62/431,687, filed on Dec. 8, 2016.

(51) Int. Cl.
| | |
|---|---|
| *G01W 1/00* | (2006.01) |
| *G08B 13/24* | (2006.01) |
| *G01W 1/02* | (2006.01) |
| *G08B 13/196* | (2006.01) |
| *G08B 13/14* | (2006.01) |

(52) U.S. Cl.
CPC ............ *G08B 13/248* (2013.01); *G01W 1/02* (2013.01); *G08B 13/1436* (2013.01); *G08B 13/1472* (2013.01); *G08B 13/19613* (2013.01); *G08B 13/2417* (2013.01); *G08B 13/2482* (2013.01)

(58) Field of Classification Search
CPC ............ G08B 13/248; G08B 13/1436; G08B 13/1472; G08B 13/19613; G08B 13/2417; G08B 13/2482; G01W 1/02
See application file for complete search history.

(56) References Cited

U.S. PATENT DOCUMENTS

| | | | |
|---|---|---|---|
| 6,392,541 B1 * | 5/2002 | Bucher | F21V 15/00 340/331 |
| 6,958,677 B1 | 10/2005 | Carter | |
| 6,970,095 B1 * | 11/2005 | Lee | G08B 13/1436 340/566 |
| 6,972,677 B2 | 12/2005 | Coulthard | |
| 7,046,138 B2 | 5/2006 | Webb, Sr. | |
| 7,327,258 B2 | 2/2008 | Fast et al. | |
| 7,342,497 B2 | 3/2008 | Chung et al. | |
| 8,350,700 B2 | 1/2013 | Fast et al. | |
| 2001/0018339 A1 * | 8/2001 | Murakami | H04W 12/12 455/411 |

(Continued)

*Primary Examiner* — Quang D Pham
(74) *Attorney, Agent, or Firm* — Fish & Richardson P.C.

(57) ABSTRACT

A method includes, receiving, by a monitoring server, weather data that corresponds to at least one weather condition at a location where a monitoring system monitors an item that is located at an outdoor location of a property and that includes a motion beacon, based on the received weather data, determining a motion tolerance for determining whether a force other than weather likely caused movement of the item, receiving, from the motion beacon, motion data that indicates motion of the item, comparing the motion data to the motion tolerance, based on comparing the motion data to the motion tolerance, determining whether to generate a monitoring system event indicating that a force other than weather likely caused the movement of the item, and performing the monitoring system event indicating that a force other than weather likely caused the movement of the item.

16 Claims, 5 Drawing Sheets

(56) References Cited

U.S. PATENT DOCUMENTS

| | | | | |
|---|---|---|---|---|
| 2002/0190859 | A1* | 12/2002 | Bucher | F21V 15/00 |
| | | | | 340/541 |
| 2003/0156029 | A1* | 8/2003 | Luode | G08B 13/1427 |
| | | | | 340/539.13 |
| 2010/0229782 | A1* | 9/2010 | Arakawa | B60R 25/102 |
| | | | | 116/33 |
| 2011/0121973 | A1* | 5/2011 | Yang | E05B 45/005 |
| | | | | 340/572.8 |
| 2012/0115540 | A1* | 5/2012 | Kurose | H04B 1/3805 |
| | | | | 455/525 |
| 2012/0215346 | A1* | 8/2012 | Gingher | G07C 9/00142 |
| | | | | 700/237 |
| 2013/0041623 | A1* | 2/2013 | Kumar | G01C 21/14 |
| | | | | 702/158 |
| 2015/0016665 | A1* | 1/2015 | Tanner | A47G 29/1214 |
| | | | | 382/101 |
| 2016/0019765 | A1* | 1/2016 | Stokes | G08B 13/1427 |
| | | | | 340/572.1 |

* cited by examiner

OUTDOOR FURNITURE MONITORING

CROSS REFERENCE TO RELATED APPLICATIONS

This application claims benefit of U.S. Provisional Application No. 62/431,687, filed Dec. 8, 2016, and titled "Outdoor Furniture Monitoring," which is incorporated by reference in its entirety.

TECHNICAL FIELD

This disclosure relates to monitoring technology and, for example, monitoring furniture items located at an exterior of a monitored property.

BACKGROUND

Many people equip homes and businesses with monitoring systems to provide increased security for their homes and businesses. Integrating beacon technology into the monitoring system to monitor items located to the exterior of a monitored property may help to increase the security of the property.

SUMMARY

Techniques are described for monitoring technology. For example, techniques are described for monitoring furniture items located at an exterior of a monitored property. In this example, monitoring furniture items may occur through the use of beacon technology.

According to an innovative aspect of the subject matter described in this application, a monitoring system includes one or more sensors that are located throughout a property, at least one of the one or more sensors being a motion beacon that is connected to an item that is located at an outdoor location of the property, and a monitoring control unit. The monitoring control unit is configured to receive weather data that corresponds to at least one weather condition at the property, based on the received weather data, determine a motion tolerance for determining whether a force other than weather likely caused movement of the item, receive, from the motion beacon, motion data that indicates motion of the item, compare the motion data to the motion tolerance, based on comparing the motion data to the motion tolerance, determine whether to generate a monitoring system event indicating that a force other than weather likely caused the movement of the item, and based on determining whether to perform the monitoring system event indicating that a force other than weather likely caused the movement of the item, performing the monitoring system event indicating that a force other than weather likely caused the movement of the item.

These and other implementations each optionally include one or more of the following optional features. The monitoring control unit is configured to receive weather data that corresponds to at least one weather condition at the property by receiving wind speed data for the location, and determine a motion tolerance for determining whether a force other than weather likely caused movement of the item by determining the motion tolerance based on the wind speed data. The monitoring control unit is configured to receiving weather data that corresponds to at least one weather condition at the location by receiving rain data for the location, and determine a motion tolerance for determining whether a force other than weather likely caused movement of the item by determining the motion tolerance based on the rain data. The monitoring control unit is further configured to determine that the monitoring system is armed, and based on determining that the monitoring system is armed, decrease the motion tolerance, compare the motion data to the motion tolerance by comparing the motion data to the decreased motion tolerance, and determine whether to generate a monitoring system event indicating that a force other than weather likely causes the movement of the item by determining whether to generate a monitoring system event indicated that a force other than weather likely caused the movement of the item based on comparing the motion data to the decreased motion tolerance.

The monitoring control unit is further configured to determine that the motion data satisfies the motion tolerance, based on comparing the motion data to the motion tolerance, and determine whether to generate a monitoring system event indicating that a force other than weather likely caused the movement of the item by generating a monitoring system event indicating that a force other than conditions likely caused movement of the item based on determining that the motion data satisfies the motion tolerance. The monitoring control unit is configured to generate a monitoring system event indicating that a force other than weather likely caused movement of the item based on determining that the motion data satisfies the motion tolerance by generating a notification that indicates that a force other than weather likely caused movement of the item, and perform the monitoring system event indicating that a force other than weather likely caused the movement of the item by providing, to a client device of a resident of the property, the notification that indicates that a force other than weather likely caused movement of the item. The monitoring control unit is configured to generate a monitoring system event indicating that a force other than weather likely caused movement of the item based on determining that the motion data satisfies the motion tolerance by generating an audible alarm.

The monitoring system further includes one or more cameras located throughout the property, and the monitoring control unit is configured to generate a monitoring system event indicating that a force other than weather likely caused movement of the item based on determining that the motion data satisfies the motion tolerance by, activating one of the one or more cameras that includes the item in a field of view of the one of the one or more cameras, and generating a notification that indicates that a force other than weather likely caused movement of the item and that includes a control to view a video captured by the one of the one or more cameras, and perform the monitoring system event indicating that a force other than weather likely caused the movement of the item by providing, to a client device of a resident of the property, the notification that indicates that a force other than weather likely caused movement of the item and that includes the control to view the video captured by the one of the one or more cameras.

The monitoring control unit is configured to generate a notification that indicates that a force other than weather likely caused movement of the item and that includes a control to view a video captured by the one of the one or more cameras by generating a notification that indicates that a force other than weather likely caused movement of the item, that includes the control to view the video captured by the camera, that includes a control to indicate that weather caused movement of the item, and that includes a control to indicate that a force other than weather caused movement of the item, and perform the monitoring system event indicating that a force other than weather likely caused the movement of the item by providing by providing, to a client device of a resident of the property, the notification that indicates that a force other than weather likely caused movement of the item, that includes the control to view the video captured by the one of the one or more cameras, that includes the control to indicate that weather caused movement of the item, and that includes the control to indicate that a force other than weather caused movement of the item.

The monitoring control unit is configured to receive, from the client device, data indicating a selection of the control indicating that weather caused movement of the item, and in response to receiving the data indicating the selection of the control indicating that weather conditions caused movement of the item, increase the motion tolerance. The monitoring control unit is further configured to receive, from an additional motion beacon of the one or more sensors that is attached to an additional item that is located at the property, additional motion data that indicates motion of the additional item, compare the motion data to the additional motion data, based on comparing the motion data to the additional motion data, determine that a difference between the motion data and the additional motion data satisfies a motion difference tolerance, determine whether to generate a monitoring system event indicating that a force other than weather likely caused the movement of the item by generating a notification that indicates that a force other than weather likely caused movement of the item, and perform the monitoring system event indicating that a force other than weather likely caused the movement of the item by providing, to a client device of a resident of the property, the notification that indicates that a force other than weather likely caused movement of the item.

The monitoring control unit is configured to receive, from a client device of a resident of the property, data indicating a time period during which a force other than weather caused movement of the item, receive additional motion data collected during the time period, receive data indicating at least one previous weather condition that occurred during the time period, and based on the additional motion data collected during the time period and the previous weather conditions that occurred during the time period, generate a motion tolerance that corresponds to the at least one previous weather condition. The monitoring control unit is further configured to receive motion data that indicates motion of the item by receiving accelerometer data from an accelerometer included in the motion beacon, receiving gyroscope data from a gyroscope included in the motion beacon, receiving magnetometer data from a magnetometer included in the motion beacon, and receiving gravity sensor data from a gravity sensor included in the motion beacon, and compare the motion data to the motion tolerance by generating a motion score based on the accelerometer data, the gyroscope data, the magnetometer data, and the gravity sensor data and comparing the motion score to the motion tolerance.

The monitoring control unit is configured to determine that the motion data does not satisfy the motion tolerance based on comparing the motion data to the motion tolerance, and determine whether to generate a monitoring system event indicating that a force other than weather likely caused the movement of the item by generating a monitoring system event indicating that a force other than weather likely caused movement of the item based on determining that the motion data does not satisfy the motion tolerance. The monitoring control unit is configured to receive motion data that indicates motion of the item by receiving accelerometer data from an accelerometer included in the motion beacon, receiving gyroscope data from a gyroscope included in the motion beacon, receiving magnetometer data from a magnetometer included in the motion beacon, and receiving gravity sensor data from a gravity sensor included in the motion beacon, and compare the motion data to the motion tolerance by comparing the accelerometer data to an accelerometer tolerance, comparing the gyroscope data to a gyroscope tolerance, comparing the magnetometer data to a magnetometer tolerance, and comparing the gravity sensor data to a gravity sensor tolerance.

The monitoring control unit is further configured to receive motion data that indicates motion of the item by receiving the motion data that indicates motion in three-dimensional space, compare the motion data to the motion tolerance by comparing the motion data for each dimension of the three-dimensional space to a respective motion tolerance for the dimension. The monitor control unit is configured to receive sensor data from the one or more sensors other than the motion beacon, and adjust the motion tolerance for determining whether a force other than weather likely caused movement of the item based on the sensor data. The monitor control unit is further configured to receive, from the one or more sensors other than the motion beacon, sensor data by receiving sensor data indicating that a person exited an exterior door of the property, adjust, for a predetermined period of time, the motion tolerance for determining whether a force other than weather likely caused movement of the item based on the sensor data indicating that the person exited the exterior door of the property by increasing the motion tolerance, and after the predetermined period of time has elapsed, adjust the motion tolerance for determining whether a force other than weather likely caused movement of the item by adjusting the motion tolerance to a value before the predetermined period of time.

The monitor control unit is configured to receive, from the one or more sensors other than the motion beacon, sensor data by receiving sensor data indicating an estimated number of people at the property exceeds a threshold, adjust the motion tolerance for determining whether a force other than weather likely caused movement of the item based on the sensor data indicating the estimated number of people at the property exceeds the threshold by increasing the motion tolerance, after adjusting the motion tolerance, receive, from the one or more sensors other than the motion beacon, additional sensor data indicating the estimated number of people at the property no longer exceeds the threshold, and based on the additional sensor data indicating the estimated number of people at the property no longer exceeds the threshold, adjust the motion tolerance to a value before receiving the sensor data indicating the estimated number of people at the property exceeds the threshold.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for monitoring furniture items located at an exterior of a monitored property, such as through the use of beacon technology. The monitoring system at a property may be integrated with beacon sensors to monitor items that are located at an unprotected area of the monitored property, for example, furniture items located on a deck or patio. Each furniture item may be equipped with a beacon that has an accelerometer that emits wireless signals periodically. The wireless signals emitted from the beacon on a periodic basis are monitored by a control unit that is located in a secured area of the monitored property. The control unit detects an alarm condition based on determining that a beacon connected to a furniture item has been moved, based on determining that a beacon has been removed from a furniture item, and/or based on failing to receive a signal from a beacon after a threshold period of time has elapsed.

Figure 1:
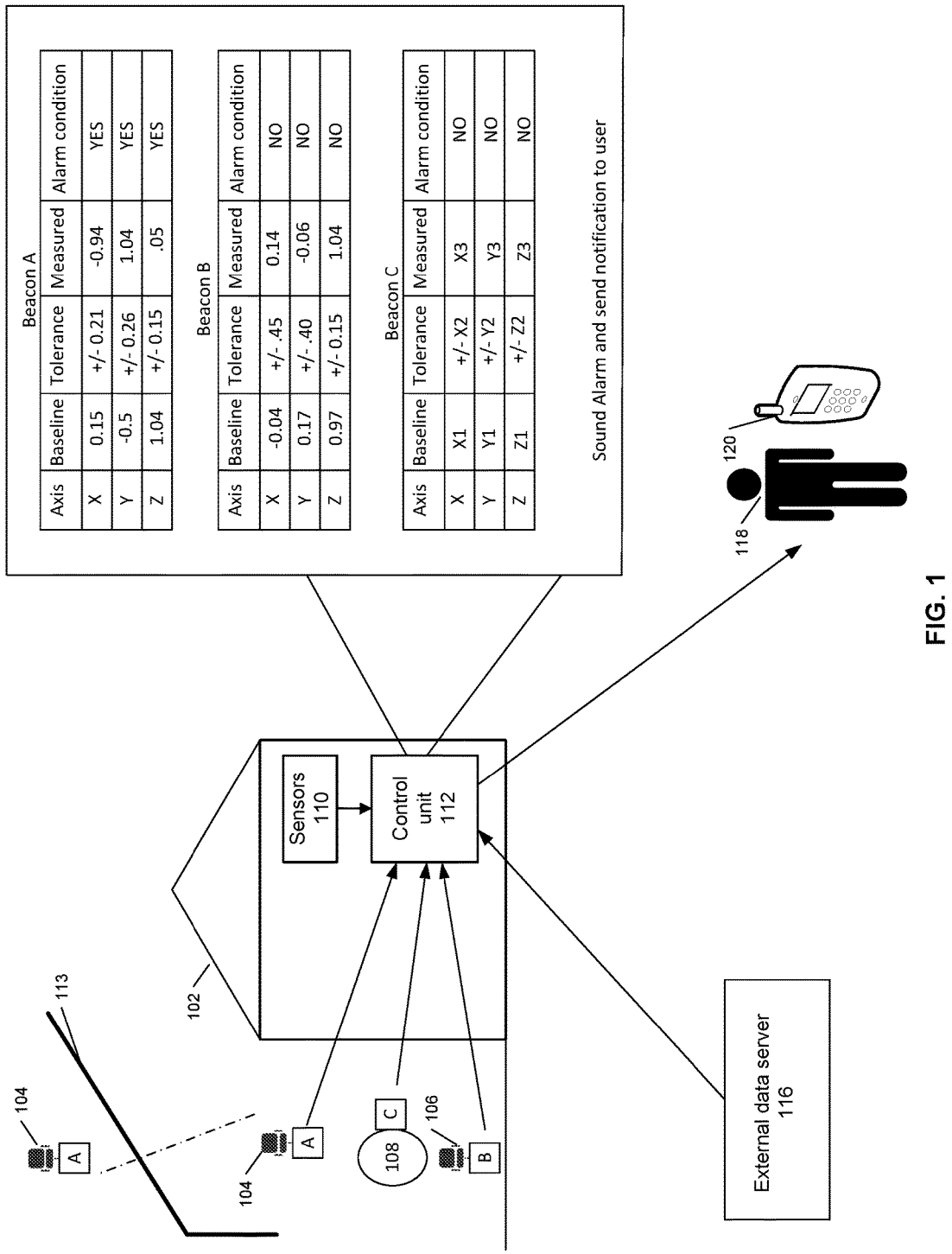
FIG. 1 illustrates an example of an outdoor furniture monitoring system.

FIG. 1 illustrates an example of a furniture monitoring system. As shown in FIG. 1, a property 102 (e.g. a home) of a user 118 is monitored by an in-home monitoring system (e.g., in-home security system) that includes components that are fixed within the property 102. The in-home monitoring system may include a control unit 112 and one or more sensors 110. The one or more sensors 110 may be any type of electronic sensors and may be located throughout the monitored property 102. The monitored property 102 may include one or more other smart sensors, such as cameras, lights, a doorbell camera, and smart locks. The in-home monitoring system may be integrated with one or more beacons A-C, that are each mounted to a patio furniture item 104-108.

The control unit 112 is the controlling component of the patio furniture monitoring system, and is configured to receive data periodically from the one or more beacons A-C. In some implementations, the control unit 112 is also the controlling component of the in-home monitoring system. In these implementations, the control unit 112 is configured to receive data from the one or more beacons, as well as data from one or more sensors 110, one or more cameras, one or more lights, smart locks, and one or more other electronic sensors located throughout the monitored property 102. In other implementations, the in-home monitoring system is controlled by a control unit that is separate and distinct from the control unit 112 that receives data from the one or more beacons A-C. In these implementations, the control unit 112 may be in communication with the separate and distinct control panel that controls the in-home monitoring system. The control unit 112 is configured to communicate wirelessly with the one or more beacons A-C over a short-range wireless connection. For example, the control unit is configured to communicate with the one or more beacons over a Bluetooth connection. The one or more beacons A-C are configured to emit Bluetooth 4.0 low energy broadcasts on a periodic basis, and the broadcasts are received by the control unit 112. Each of the one or more beacons A-C contains an accelerometer that is configured to sense acceleration in three different axes, the broadcasts produced by each of the one or more beacons A-C include identifying information and the accelerometer data for each of the three different axes. In some examples, each of the one or more beacons may include an accelerometer, a gyroscope, and/or a magnetometer. The gyroscope detects rotational direction changes of the beacon, and the magnetometer detects changes in the magnetic field of the beacon.

The control unit 112 hosts an algorithm that is configured to determine when a furniture item is being stolen based on the accelerometer data received from the beacon attached to the furniture item. The algorithm is configured to determine the probability of a detected anomaly event being a real event, that is, the probability that a detected anomaly event is an event where a furniture item is being stolen. The algorithm is also designed to determine the threat level of a detected anomaly event, and in response to determining the threat level of a detected anomaly event, scaling the actions of a response to the detected anomaly event based on the probability and the threat level. The control unit 112 may be configured to calculate a percentage of likelihood that the detected alarm condition is associated with theft of the item associated with the beacon. For example, the control unit 112 may calculate the a 70% chance of an alarm condition being a theft. The control unit 112 is configured to perform one or more different actions based on the calculated percentage of likelihood. For example, the control unit may communicate with an external monitoring server when the calculated percentage is over 90%, the monitoring server may in turn contact law enforcement to dispatch authorities to the property 102. In other examples, the control unit 112 may access video data from one or more cameras around the property 102 when the calculated percentage is between 60% and 80%. In such examples, when the control unit receives data from a beacon that represents movement, and the control unit 112 calculates, based on the received data, that the probability of theft is between 60-80%. Based on the calculated probability, the control unit 112 may trigger an automated analysis of video data received by the control unit 112. In some implementations, a live stream of the video data may be communicated to an external monitoring server where the live video data is analyzed to determine whether the video data corresponds to someone attempting to steal the furniture item associated with the beacon that triggered the alarm condition. In some implementations, the automated analysis of video data and live video data may occur at the control unit. The control unit may automatically cancel an alarm condition based on the analysis of the video stream data, where the video stream data confirms that a theft is not occurring. For example, the video stream data may show that an unknown person is merely sitting on the furniture item. The control unit may communicate the video stream data analysis to the user for the user to confirm before cancelling an alarm condition. For example, the control unit may communicate the video data to the user device of a user associated with the property, and ask the user to confirm whether or not the stranger sitting on the furniture should be treated as an alarm condition. The control unit may utilize machine learning algorithms to automatically identify situations that should be considered as alarm conditions and other situations that should not be considered an alarm condition.

A monitored property 102 may have one or more patio furniture items 104, 106, and 108 that are located at an exterior of the monitored property 102. A beacon A, B, and C is attached to each of the one or more patio furniture items 104, 106, and 108 respectively, and is configured to monitor the movement and/or acceleration associated with the furniture item. The beacon may be attached to a furniture item by an adhesive, and may be configured to be weather proof. As illustrated in FIG. 1, a thief may attempt to steal a patio chair 104 from the monitored property 102, and may move the chair 104 over the back fence 113. The beacon A attached to the patio chair 104 is constantly emitting Bluetooth broadcasts to the control unit 112. The broadcast from the beacon A includes identifying information that identifies the beacon by a unique identifier, and includes accelerometer data for the x, y, and z axes. When a furniture item is moved with the beacon still attached to the item, the beacon's accelerometer broadcasts the forces exerted on the furniture item to the control unit 112. In some examples, when the furniture item is moved with the beacon still attached, the beacon's accelerometer will begin to broadcast data to the control unit more frequently than when the furniture item is stationary. For example, the beacon A may broadcast at a rate twice that of the typical broadcast rate.

The control unit 112 compares a baseline reading for each of the beacons A-C to the measured reading received in the broadcast to determine whether an alarm condition should be detected. During the initial configuration of the monitoring system, the control unit 112 captures a baseline reading for each of the axes of the accelerometer of each of the one or more beacons A-C associated with the monitored property 102, and may store the baseline readings in its memory. When data is received from the one or more beacons A-C, the control unit compares the received data to the baseline reading specific to the beacon to determine whether an event is an anomaly. As illustrated in FIG. 1, each of the x, y, and z axes for each of the beacons has a specified threshold tolerance value, a beacon is considered to be moving if the measured accelerometer values are outside the range of the baseline value +/− the threshold tolerance value. The threshold tolerance level for each of the different axes of a given beacon may be different, for the example shown, for beacon A, the tolerance for the x axis is +/−0.21, the tolerance for the y axis is +/−0.45, and the tolerance for the z axis +/−0.0137. In some examples, the threshold tolerance values for each of the accelerometer axes of the beacon is adjusted based on a time of day. The threshold tolerance values for each of the axes of each of the beacons may be lower during the night, and therefore an abnormal reading can be triggered more quickly.

As shown in FIG. 1, the control unit 112 determines that the threshold tolerance for each of the axis x, y, and z axes for beacon A are exceeded, and detects an alarm condition. The control unit 112 may determine that the threshold tolerance for one or more of the x, y, and z axes for a particular beacon is exceeded. For example, the x axis may detect an alarm condition while the y and z axes are within the normal tolerance range. The control unit 112 may determine an alarm condition based on receiving one abnormal reading from a particular beacon. However, in order to reduce the number of false detections, the control unit 112 may be configured to receive three abnormal readings from a particular beacon to detect an alarm condition. In these examples, the control unit 112 may be configured to detect three abnormal readings in succession to detect an alarm condition. In some other examples, the control unit 112 may be configured to detect three abnormal readings from a particular beacon within a period of time to detect an alarm condition. For example, an alarm condition may be detected when three abnormal readings are received from a particular beacon over a ten to thirty-second time period.

When an alarm condition is detected, the control unit 112 may sound an alarm and send a notification to user 118. The control unit 112 may receive configuration instructions that specify the action the control unit 112 takes in response to detecting an alarm condition. For the example illustrated, the control unit 112 sounds the alarm associated with the in-home monitoring system and sends a notification to the user device 120 of the user 118. In other examples, the actions may include sending an email notification to a user, turning on one or more smart lights, capturing one or more pictures and or video recordings of the exterior of the monitored property by an external camera, and communicating with a central alarm station. In some implementations, the control unit 112 may be configured to perform one or more of the described actions. For example, the control unit 112 may be configured to turn on one or more smart lights and capture one or more images of the exterior of the monitored property. The control unit 112 may be configured to calculate a percentage of likelihood that the detected alarm condition is associated with theft of the item associated with the beacon.

As described earlier, the control unit 112 may be the same control unit that controls the in-home monitoring system of the monitored property 102. In these implementations, the control unit 112 may be in communication with one or more cameras, one or more sensors, and a monitoring server that is external to the monitored property. In the implementations where the in-home monitoring system is controlled by a control unit that is separate and distinct from the control unit 112, the control unit 112 may be in communication with the control unit controlling the in-home system, and may communicate the instructions for the action to be taken based on the detected abnormal condition. The in-home monitoring control unit may communicate with the control unit 112 through direct communication, or may in some examples communicate with the control unit 112 via cloud communication.

In some examples, the property 102 may not be monitored by an in-home monitoring system. In such examples, the control unit 112 may communicate notifications to the user 118 identifying detected movements associated with the beacons at the property 102. The notifications may include a likelihood of theft percentage value. For example, the notification may indicate that beacon A, associated with a patio chair, and a 45% chance that the chair is being stolen. The user may decide whether to contact law enforcement based on the received likelihood of theft value included in the notification.

In some implementations, the control unit 112 may be configured to receive external data from an external data server 116, and may adjust the tolerance levels of the one or more beacons associated with the monitored property 102 based on the received data. The control unit 112 may be configured to receive configuration instructions from a remote server. The configuration instructions received from the remote server may include a list of one or more beacons to monitor. The configuration instructions received from the remote server may include, for each of the identified beacons, a tolerance threshold for each of the three axes for the beacon's accelerometer, and a maximum threshold period of time allowed between communication with the beacon and the control unit 112 before an alarm condition is detected. The control unit 112 may receive updated configuration instructions based on the received external data. For example, the control unit 112 may receive weather data informing of rain and or windy conditions for a specified time period, and may receive updated tolerance thresholds based on the expected weather conditions.

The external data received from the external data server 116 may include local crime data. The control unit 112 may receive crime data that indicates one or more confirmed incidents have occurred in the local area, and based on the received crime data may lower the threshold for the one or more axes of the one or more beacons A-C to easily detect any movement of the patio furniture items.

The control unit 112 hosts an algorithm that is configured to determine the probability of a detected alarm condition as being a real alarm event, and is configured to determine the threat level of a detected alarm condition. In some implementations, the algorithm may be hosted on a server that is in communication with the control unit 112. The algorithm controls the function of the control unit 112 and weighs the one or more different characteristics of the data received by the control unit 112 to enhance the accuracy of the assessment of a detected alarm condition. The algorithm may use one or more environmental characteristics of the monitored property 102 to enhance the accuracy of the assessment of a detected alarm condition. In some implementations, the algorithm may use weather reports, on site video data, time of day data, alarm system status, and crime data for local area surrounding the monitored property 102. For example, the algorithm may consider alarm conditions that were detected when the in-home alarm system was armed as potentially more serious than alarm conditions that were detected when the in-home alarm system was unarmed.

The algorithm may utilize machine learning and user feedback to more accurately detect alarm conditions. During the initial configuration of the furniture monitoring system, the algorithm hosted on the control unit 112 is in a learning mode, and may request user feedback to confirm a detected alarm condition. For example, when an anomaly is detected by the control unit 112, the user 118 may be queried to confirm whether the event was an alarm condition or not. The control unit 112 may store the data associated with the system's response and the user's input to help accurately classify events in the future.

Figure 2:
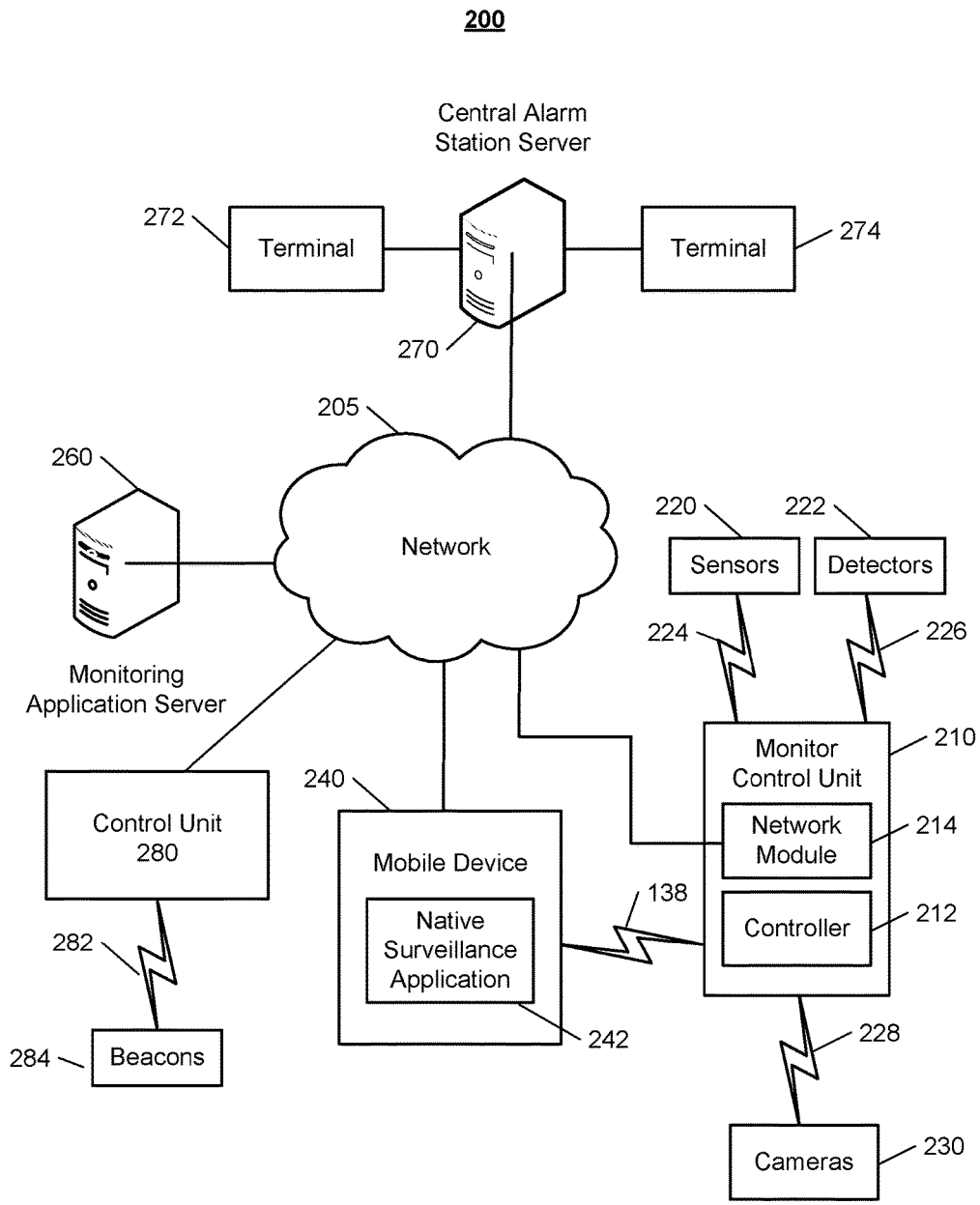
FIG. 2 illustrates an example monitoring system.

The data received by the control unit 112 during the initial configuration of the furniture monitoring system may be used to train a neural network. For example, the received beacon data, external data and in-home monitoring data may be feed to a neural network decision tool to identify whether the decision on an alarm condition made by the monitoring system matches the decision made by the neural network tool. The algorithm may be updated if the decision made by the decision tool is different than the one made by the control unit 112. FIG. 2 illustrates an example of a system 200 configured to monitor a property. The system 200 includes a network 205, a monitoring system control unit 210, one or more user devices 240, a monitoring application server 260, a monitor control unit 210, a control unit 280, and a central alarm station server 270. In some examples, the network 205 facilitates communications between the monitor control unit 210, the one or more user devices 240, the monitoring application server 260, and the central alarm station server 270. The network 205 is configured to enable exchange of electronic communications between devices connected to the network 205. For example, the network 205 may be configured to enable exchange of electronic communications between the monitor control unit 210, the one or more user devices 240, the monitoring application server 260, and the central alarm station server 270. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitor control unit 210 includes a controller 212 and a network module 214. The controller 212 is configured to control a monitoring system (e.g., a home alarm or security system) that includes the monitor control unit 210. In some examples, the controller 212 may include a processor or other control circuitry configured to execute instructions of a program that controls operation of an alarm system. In these examples, the controller 212 may be configured to receive input from sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitoring system control unit 210.

The control unit 280 may include a processor or other control circuitry configured to execute instructions of a program that controls operation of a patio furniture monitoring system. In these examples, the control unit 280 may be configured to receive data from one or more beacons 284. In some implementations, the control unit may 280 be located at a monitored property that is monitored by the monitoring system controlled by the monitor control unit 210. In some implementations, the control unit 280 may be distinct and separate from the monitor control unit 210. In other implementations, the control unit 280 and the monitor control unit 210 may be the same device.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring control unit 210 to communicate over a local area network and/or the Internet. The network module 214 also may be a voiceband modem configured to enable the alarm panel to communicate over the telephone lines of Plain Old Telephone Systems (POTS).

The monitoring system that includes the monitor control unit 210 includes one or more sensors, one or more motion detectors, and one or more cameras. For example, the monitoring system may include multiple sensors 220. The sensors 220 may include a contact sensor, a motion sensor, a glass break sensor, or any other type of sensor included in an alarm system or security system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 220 may include a radio-frequency identification (RFID) sensor that identifies a particular article that includes a pre-assigned RFID tag.

The one or more cameras 230 may be a video/photographic camera or other type of optical sensing device configured to capture images. For instance, the one or more cameras 230 may be configured to capture images of an area within a building monitored by the monitor control unit 210. The one or more cameras 230 may be configured to capture single, static images of the area and also video images of the area in which multiple images of the area are captured at a relatively high frequency (e.g., thirty images per second). The one or more cameras 230 may be controlled based on commands received from the monitor control unit 210.

The one or more cameras 230 may be triggered by several different types of techniques. For instance, a Passive Infra Red (PIR) motion sensor may be built into the one or more cameras 230 and used to trigger the one or more cameras 230 to capture one or more images when motion is detected. The one or more cameras 230 also may include a microwave motion sensor built into the camera and used to trigger the camera to capture one or more images when motion is detected. Each of the one or more cameras 230 may have a "normally open" or "normally closed" digital input that can trigger capture of one or more images when external sensors (e.g., the sensors 220, PIR, door/window, etc.) detect motion or other events. In some implementations, at least one camera 230 receives a command to capture an image when external devices detect motion or another potential alarm event. The camera may receive the command from the controller 212 or directly from one of the sensors 220.

In some examples, the one or more cameras 230 triggers integrated or external illuminators (e.g., Infra Red, Z-wave controlled "white" lights, lights controlled by the module 222, etc.) to improve image quality when the scene is dark. An integrated or separate light sensor may be used to determine if illumination is desired and may result in increased image quality.

The sensors 220, the detectors 222, and the cameras 230 communicate with the controller 212 over communication links 224, 226, and 228. The communication links 224, 226, and 228 may be a wired or wireless data pathway configured to transmit signals from the sensors 220, the detectors 222, and the cameras 230 to the controller 212. The sensors 220 and the cameras 230 may continuously transmit sensed values to the controller 212, periodically transmit sensed values to the controller 212, or transmit sensed values to the controller 212 in response to a change in a sensed value.

The communication link 228 over which the cameras 230 and the controller 212 communicate may include a local network. The cameras 230 and the controller 212 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network.

The monitoring application server 260 is an electronic device configured to provide monitoring services by exchanging electronic communications with the monitor control unit 210, and the one or more user devices 240, over the network 205. For example, the monitoring application server 260 may be configured to monitor events (e.g., alarm events) generated by the monitor control unit 210. In this example, the monitoring application server 260 may exchange electronic communications with the network module 214 included in the monitoring system control unit 210 to receive information regarding events (e.g., alarm events) detected by the monitoring system control unit 210. The monitoring application server 260 also may receive information regarding events (e.g., alarm events) from the one or more user devices 240.

The one or more user devices 240 are devices that host and display user interfaces. The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a native surveillance application 242. The native surveillance application 242 refers to a software/firmware program running on the corresponding mobile device that enables the user interface and features described throughout. The user device 240 may load or install the native surveillance application 242 based on data received over a network or data received from local media. The native surveillance application 242 runs on mobile devices platforms, such as iPhone, iPod touch, Blackberry, Google Android, Windows Mobile, etc. The native surveillance application 242 enables the user device 140 to receive and process image and sensor data from the monitoring system.

The central alarm station server 270 is an electronic device configured to provide alarm monitoring service by exchanging communications with the monitor control unit 210, the one or more user devices 240, and the monitoring application server 260 over the network 205. For example, the central alarm station server 270 may be configured to monitor alarm events generated by the monitoring system control unit 210. In this example, the central alarm station server 270 may exchange communications with the network module 214 included in the monitor control unit 210 to receive information regarding alarm events detected by the monitor control unit 210. The central alarm station server 270 also may receive information regarding alarm events from the one or more user devices 240.

The central alarm station server 270 is connected to multiple terminals 272 and 274. The terminals 272 and 274 may be used by operators to process alarm events. For example, the central alarm station server 270 may route alarm data to the terminals 272 and 274 to enable an operator to process the alarm data. The terminals 272 and 274 may include general-purpose computers (e.g., desktop personal computers, workstations, or laptop computers) that are configured to receive alarm data from a server in the central alarm station server 270 and render a display of information based on the alarm data. For instance, the controller 212 may control the network module 214 to transmit, to the central alarm station server 270, alarm data indicating that a sensor 220 detected a door opening when the monitoring system was armed. The central alarm station server 270 may receive the alarm data and route the alarm data to the terminal 272 for processing by an operator associated with the terminal 272. The terminal 272 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 272 and 274 may be mobile devices or devices designed for a specific function. Although FIG. 2 illustrates two terminals for brevity, actual implementations may include more (and, perhaps, many more) terminals.

In some implementations, the one or more user devices 240 communicate with and receive monitoring system data from the monitor control unit 210 using the communication link 238. For instance, the one or more user devices 240 may communicate with the monitor control unit 210 using various local wireless protocols such as wifi, Bluetooth, zwave, zigbee, HomePlug (ethernet over powerline), or wired protocols such as Ethernet and USB, to connect the one or more user devices 240 to local security and automation equipment. The one or more user devices 240 may connect locally to the monitoring system and its sensors and other devices. The local connection may improve the speed of status and control communications because communicating through the network 205 with a remote server (e.g., the monitoring application server 260) may be significantly slower.

Although the one or more user devices 240 are shown as communicating with the monitor control unit 210, the one or more user devices 240 may communicate directly with the sensors and other devices controlled by the monitor control unit 210. In some implementations, the one or more user devices 240 replace the monitoring system control unit 210 and perform the functions of the monitoring system control unit 210 for local monitoring and long range/offsite communication.

Other arrangements and distribution of processing is possible and contemplated within the present disclosure.

Figure 3:
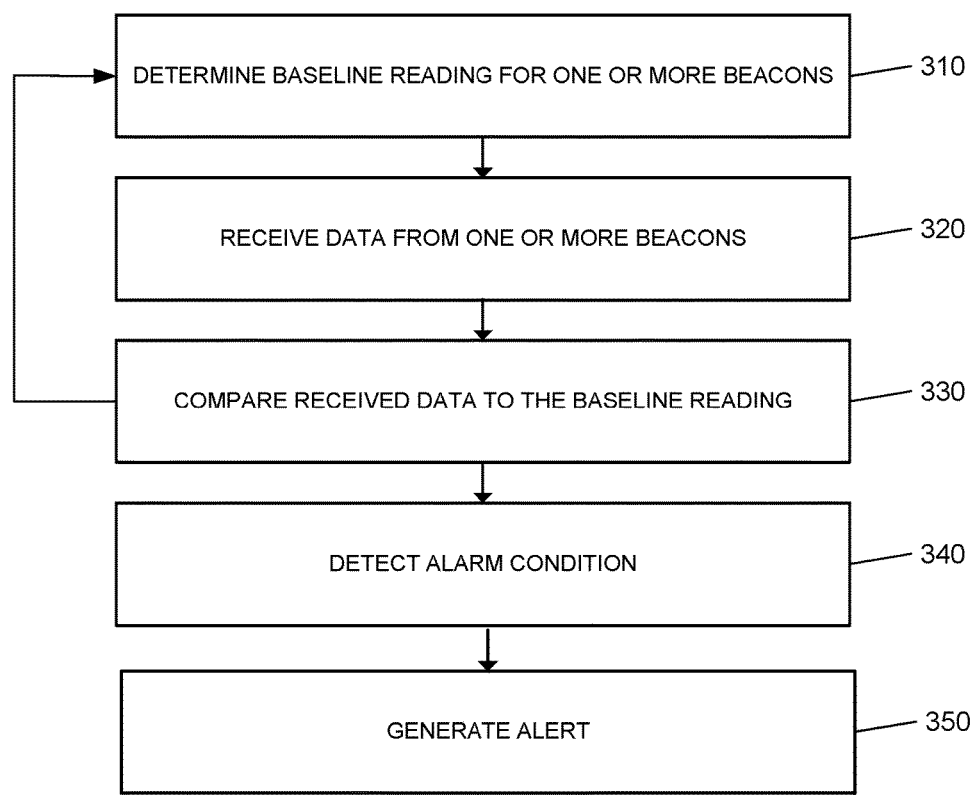
FIG. 3 is a flow chart of an example process for generating an alert based on detecting an alarm condition.

FIG. 3 is a flow chart of an example process 300 for generating an alert based on detecting an alarm condition. The control unit determines a baseline reading for each of the one or more beacons associated with a monitored property (310). During the initial configuration of the furniture monitoring system, the control unit establishes communication with each of the one or more beacons associated with monitored furniture items at the monitored property. Each of the one or more beacons may be configured to communicate wirelessly with the control unit. Each of the one or more beacons broadcast Bluetooth 4.0 low energy periodically, and the control unit is configured to receive the Bluetooth 4.0 low energy broadcast. The broadcasts produced by each of the one or more beacons may include identifying information and accelerometer readings for three different axes. In some examples, each of the beacons may be configured to communicate with the control unit by another wireless communication mode. In some implementations, the control unit may perform a communication handshake protocol to establish communication with a beacon. The control unit may communicate an encryption key to a beacon to initiate communication, the beacon may encrypt the accelerometer data using the received encryption key and communicate the encrypted data to the control unit to establish secure data communication between the control unit and the beacon.

The control unit is configured to allow for programming logic, and hosts an algorithm that determines whether a beacon has experienced movement which is indicative of someone stealing the monitored furniture. The control unit is configured with software that monitors the one or more beacons by monitoring the Bluetooth communications between the control unit and the one or more beacons. The control unit may receive configuration instructions from a remote server that communicates with one or more other control units associated with one or more other monitored properties. In some implementations, the control unit may receive configuration instructions from the remote server on a periodic basis. For example, the control unit may receive configuration instructions on a monthly basis. The configuration instructions received from the remote server may include a list of one or more beacons to monitor. Each of the one or more beacons on the list of beacons to monitor may identify the beacons by a name and a unique beacon ID. The configuration instructions received from the remote server may include, for each of the identified beacons, a tolerance threshold for each of the three axes for the beacon's accelerometer, and a maximum threshold period of time allowed between communication with the beacon and the control unit before an alarm condition is detected. The configuration instructions may include a set of one or more actions to execute when an alarm condition is detected by the control unit. The configuration instructions may also include a set of global parameters, such as, an updated configuration URL, a set of default tolerances for the accelerometers, the number of abnormal readings to detect before generating an alarm, and a global enabled/disabled flag.

The control unit may be configured to upload data to a remote location on a periodic basis. The control unit may upload run data, that includes data indicative of how often each beacon communicated with the control unit over a period of time, and how many alerts occurred in that time period. The control unit may also upload movement data that includes the accelerometer readings for any readings that are determined to be outside the tolerances of the accelerometer for noise, and alarm data that includes a start time and an end of any generated alarms, and identifies the beacon that caused the alarm. The alarm data may include data that indicates whether the generated alarm occurred due to movement of the beacon or lack of communication with a beacon (a missing beacon). The control unit may also upload error data that includes errors that occurred when capturing or uploading data.

The control unit determines a baseline state of a beacon based on the initial reading of the beacon's accelerometer, and determines a baseline state for each of the one or more beacons associated with the monitoring system. For example, the control unit may determine the baseline accelerometer reading for beacon A to be 1.04 G, and the baseline accelerometer reading for beacon B to be 1.1 G. In some examples, the control unit may determine the baseline reading for each of the one or more beacons on a periodic basis. For example, the control unit may determine a baseline reading for each of the one or more beacons on a weekly basis. In some examples, the furniture items at the monitored property may be monitored by a programmable Bluetooth device that includes an accelerometer, a gyroscope, and magnetometers. In these examples, the control unit may communicate with the Bluetooth device wirelessly, and may determine a baseline reading for the accelerometer, the gyroscope and the magnetometers of the programmable Bluetooth device. The gyroscope detects rotational direction changes of the beacon, and the magnetometer detects changes in the magnetic field of the beacon.

The control unit receives data from one or more beacons (320). The control unit may receive data wirelessly from the one or more beacons. In some implementations, the control unit may be an electronic device that is configured to facilitate both Wi-Fi and Bluetooth communication. In some examples, the control unit be configured to facilitate other modes of wireless communications, for example, Z-wave communication. The control unit may be configured to constantly monitor for Bluetooth 4.0 low energy broadcasts, and identify the broadcast that are originating from the one or more beacons associated with the monitored property. The control unit may receive the broadcast of the accelerometer data from the one or more beacons periodically. The control unit may determine an alarm condition when data from a particular beacon is not received within a threshold period. For example, an alarm condition may be determined when the control unit does not receive data from a beacon in the last 5 seconds if the beacon is configured to transmit data every 2 seconds.

The control unit compares the received data to the baseline reading (330). When the control unit receives a broadcast from a specific beacon associated with the monitored property, the control unit compares the received data to the baseline readings of the specific beacon. The monitor control unit may store the baseline reading accelerometer data for each of the one or more beacons associated with the monitoring system in storage, and may access the stored baseline readings associated with a specific beacon based on the identifying information received with the accelerometer data. For example, the control unit may compare a received accelerometer z axis reading of 1.38 G to the baseline reading for the specific beacon of 1.07 G. The control unit periodically determines the baseline reading for each of the one or more beacons. When the received data does not exceed the predetermined threshold value for a particular beacon, the control unit may once again determine the current baseline value for the beacon. The control unit detects an alarm condition (340). An alarm condition is detected when the accelerometer data received from a particular beacon exceeds a predetermined threshold tolerance value. For example, the baseline z axis reading for a specific beacon is 1.04 G and the threshold tolerance value is +/−0.135 G, the monitor control unit determines an alarm condition based on receiving a z axis accelerometer reading of 1.29 G. In some examples, the control unit may be configured to receive more than one abnormal beacon readings from a specific beacon before determining an alarm condition. For example, the control unit is configured to receive three readings that each exceed the predetermined threshold tolerance value for a given beacon before determining an alarm condition. In some implementations, a user may have the ability to set the number of abnormal beacon readings from each of the more or more beacons required to determine an alarm condition. For example, a user may determine that four abnormal beacon readings are required to determine an alarm condition for beacon A attached to a patio chair, and two abnormal beacon readings are required to determine an alarm condition for beacon B attached to a table patio table.

The control unit may detect an alarm condition when the control unit has not received any communication from a specific beacon within a threshold period of time. A timer associated with the control monitor may be used to periodically check the last time communication was received from each of the one or more beacons. For example, the control unit may determine an alarm condition if beacon C has not communicated with the control unit within the last ten seconds. An alarm condition may be detected when the control unit determines that the wireless connections in the vicinity of the monitored property have been blocked. For example, the control unit may not have received any wireless communication in the past five minutes, and may determine that the wireless communication has been blocked. The control unit generates an alert (350). The control unit generates an alert based on detecting an alarm condition, and takes an action based on the configuration instructions received from the remote server. In some examples, the configuration instructions may indicate that when an alarm condition is identified, the control unit may generate an email alert to the one or more users associated with the monitored property. In some examples, the control unit may generate an SMS text alert to one or more users associated with the monitored property.

In some implementations, the furniture monitoring system is integrated with an in-home monitoring alarm system and the generated alert may be an audible or visual alert produced by one or more electronic devices at the monitored property. For example, the control unit may communicate to the in-home monitoring system to turn on or blink one or more lights at the monitored property. For another example, the control unit may communicate to the in-home monitoring system to contact a central station that will in turn contact local law enforcement.

In some implementations, the control unit may be configured to communicate the data received from the one or more beacons to an external monitoring entity. For example, the control unit may communicate the beacon data stream to a cloud application. In these implementations, the external monitoring entity may generate an alarm when data is not received from the control unit.

The control unit may detect when the one or more beacons that triggered an alarm condition return to the baseline reading. When the one or more beacons that triggered the alarm condition are detected return to the baseline reading, the control unit may determine that the alarm condition has ended. In some examples, the control unit may generate a notification to the one or more users associated with the monitored property that indicates that a detecting alarm condition has ended.

Figure 4:
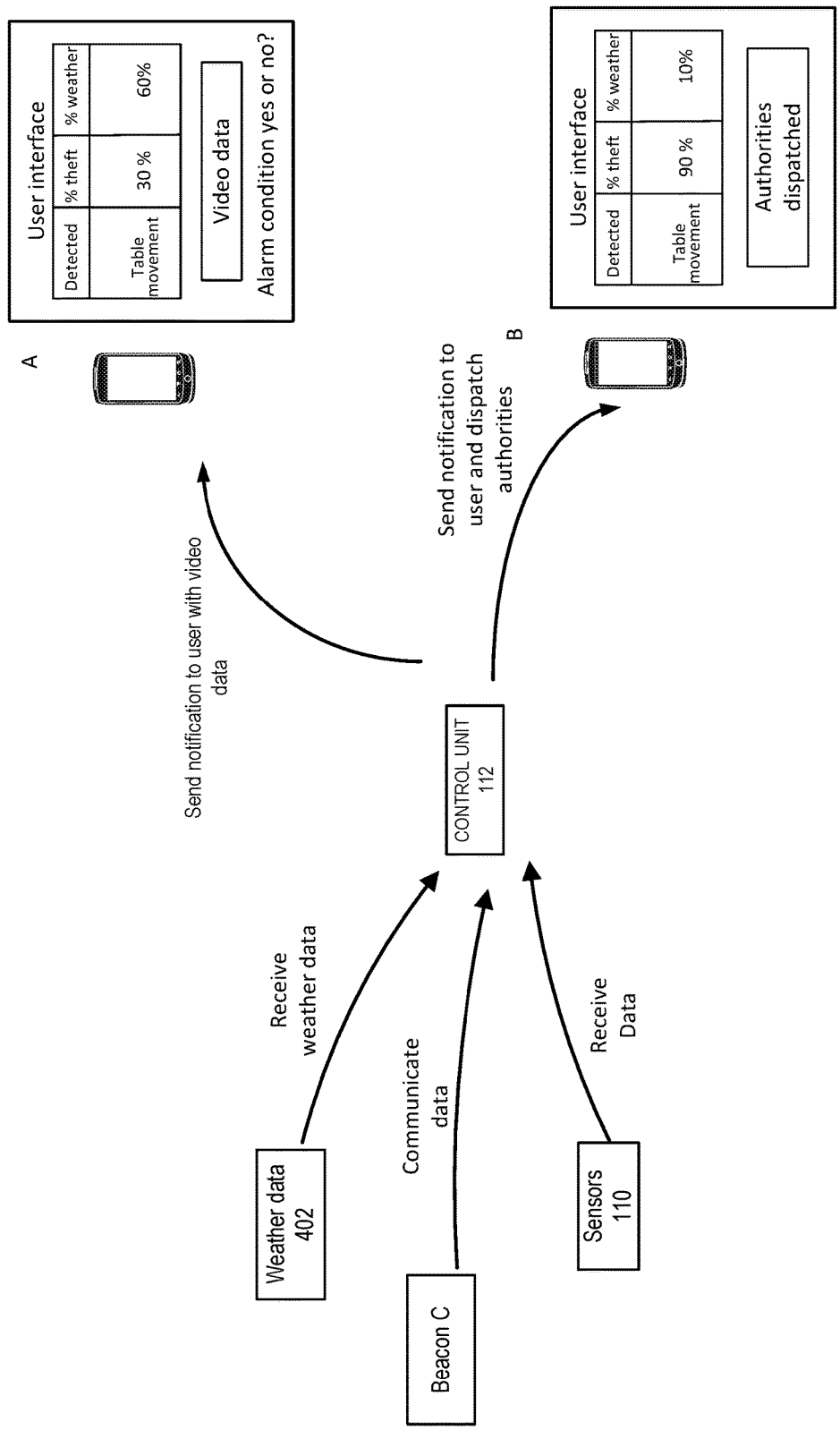
FIG. 4 illustrates an example system for generating notifications.

FIG. 4 illustrates an example system for generating notifications. As illustrated, the control unit 112 may receive data from beacon C that detects movement. As described above, the beacon communicates the accelerometer values for each of the x, y, and z axes. The control unit compares the received data to a baseline reading for the beacon, and detects an alarm condition when a threshold tolerance for an axis of the beacon is exceeded. The control unit 112 also receives weather data 402 from an external weather data server. The weather data 402 may represent local weather data associated with the zip code, county, state, and/or neighborhood of the monitored property. The algorithm that is hosted at the control unit 112 may use the received weather data 402 and beacon accelerometer data to calculate a percentage of likelihood that the detected alarm condition is in fact associated with theft of the item associated with beacon C. Based on the calculated percentage of likelihood, the control unit is configured to automatically rule out false alarm conditions that are caused by detection in movement caused by weather, such as, for example, windy and/rainy conditions. For example, when the local weather is windy, the control unit may automatically cancel the detected alarm condition.

As illustrated in example A, the control unit calculates the percentage likelihood of theft of the table associated with beacon C to be 30%, and calculates that the likelihood the alarm condition associated with beacon C is associated with the weather to be 60%. The control unit may communicate the calculated percentages to the user device of a user associated with the monitored property. In some examples, when the percentage likelihood of theft is above a threshold value, the control unit may communicate live video data to the user device. The user may receive the live video data and may determine whether the control unit should treat the detected event as an alarm condition or not. The user may respond to the received notification, based on the user analysis of the received video data to identify whether the event is an alarm condition or not.

As illustrated in example B, the control unit calculates the percentage likelihood of theft associated with beacon C to be 90%, and calculates that the likelihood the alarm condition associated with beacon C is associated with the weather to be 10%. The control unit communicates the calculated percentages to the user device of the user associated with the monitored property. As illustrated, the control unit may determine to dispatch authorities to the monitored property based on the calculated percentage likelihood of theft being over a threshold value. The notification sent to the client device of the user may include that the authorities have been dispatched to the monitored property. In some examples, the control unit may communicate video data to the user even when authorities have already been dispatched to the monitored property.

In some implementations, the control unit may take one or more different actions based on user set preferences. A user may set one or more preferences based on the method of notification preference and a threshold percentage likelihood of theft for which to receive notifications. For example, a user may ask to receive notification when the control unit determines to dispatch authorizes to the property based on the high percentage of theft likelihood. In other examples, the user may ask to receive notifications and video data each time an alarm condition is detected.

Figure 5:
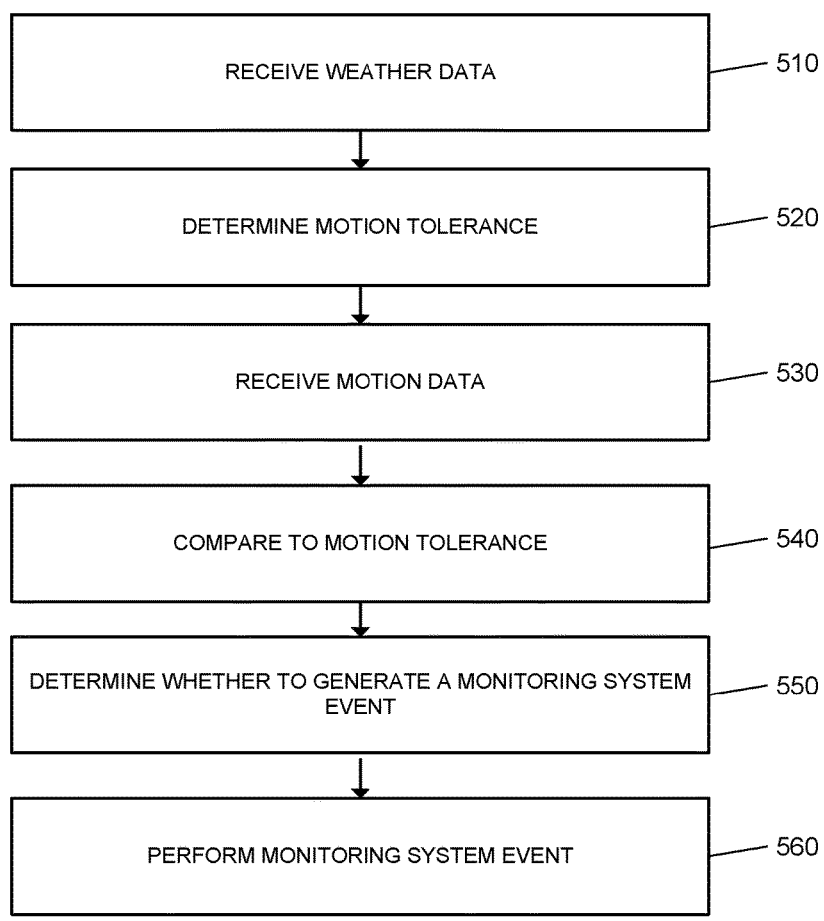
FIG. 5 is a flow chart of an example process for determining whether to generate an alarm condition.

FIG. 5 is a flow chart of an example process for determining whether to generate an alarm condition at a monitored property. The monitoring server is in communication with a control unit at the monitored property. The control unit at the monitored property controls the monitoring system and is configured to receive data from sensors and cameras located throughout the property. The control unit receives data from one or more motion beacons that are attached to items located at the property. For example, a motion beacon may be attached to a patio chair at the monitored property. The data received from the motion beacon is communicated to the monitoring server, and the monitoring server determines whether the received data indicates that the movement was caused by the weather conditions or was caused by another force, for example, a force caused by a burglar moving the item. In some implementations, the control unit receives the weather data directly and is configured to determine whether to generate an alarm condition at the monitored property. In other implementations, the monitoring server determines whether to generate an alarm condition at the monitored property.

The monitoring server receives weather data (510). The monitoring server is in communication with a weather data server that provides the local weather conditions for the location of the monitored property. For example, the weather data server may provide the weather conditions for the zip code of the monitored property. The weather data server may provide weather data to the monitoring server on a continuous basis. For example, the weather data server may provide daily weather reports to the monitoring server. The weather data may include, for example, wind speed data and rain speed data for the location of the monitored property. In some examples, the weather data server may provide weather data to the monitoring server when extreme weather occurs. For example, weather data server may provide data to the monitoring server when the wind speed or the rain speed exceeds a threshold.

The monitoring server determines a motion tolerance for determining whether a force other than weather conditions likely caused movement of the item based on the received weather data (520). The motion beacon attached to the item may include an accelerometer, a gyroscope, and/or a magnetometer. The gyroscope detects rotational direction changes of the motion beacon attached to the item, and the magnetometer detects changes in the magnetic field of the motion beacon attached to the item. The accelerometer of the motion beacon senses acceleration in three different axes, the x, y, and z axes. During the initial configuration of the system, when the motion beacon is attached to an item, the motion beacon communicates baseline accelerometer data to the control unit. The accelerometer data received by the control unit is communicated to the monitoring server and stored in memory. The monitoring server determines that motion of an item has occurred when the accelerometer data received from the motion beacon attached to the item exceeds a threshold for at least one of the x, y, or z axes. As described earlier, each of the x, y, and z axes of the motion beacon has a specified tolerance value, an item is considered to be moving when the measured accelerometer vales are outside the range of the baseline value +/− the threshold tolerance value. For example, the baseline value for the x axis may be 1.0, the threshold tolerance value for the x axis of the accelerometer may be +/−0.15, when the monitoring server receives an x axis value of 1.25, the monitoring server determines that the data received indicates motion of the item.

The monitoring server determines a motion tolerance for determining whether a force other than the weather conditions likely caused movement of the item by adjusting the tolerance value for each of the x, y, or z axes based on the received weather data. When the monitoring server receives weather data that indicates that the wind speed at the location of the monitored property exceed a wind speed threshold, the monitoring server may increase the motion tolerance values for each of the x, y, and z axes of the motion beacon. For example, the motion tolerance value for the x axis of the accelerometer may be increased to +/−0.2.0, the motion tolerance value for the y axis of the accelerometer may be increased to +/−0.2.5, and the motion tolerance value for the 7 axis of the accelerometer may be increased to +/−0.3.0. When the monitoring server receives weather data that indicates that the rain speed at the location of the monitored property, the monitoring server increases the motion tolerance values for each of the x, y, and z axes. In some implementations, when the monitoring server receives weather data that indicates wind speeds or rain speeds that exceed a threshold, the monitoring server may adjust each of the motion values for the x, y, and z axes, in other implementations, the monitoring server may adjust the motion tolerance values for at least one of the x, y, or z axes. In some implementations, the monitoring server may determine a motion tolerance for determining whether a force other than the weather conditions likely caused the movement of the item using an algorithm. For example, the monitoring server may use an algorithm to determine the motion tolerance based on the wind speeds and the rain speeds.

In some implementations, the monitoring server may adjust the motion tolerance based on the armed status of the monitoring system at the monitored property. For example, the monitoring server may adjust the motion tolerance values for each of the x, y, and z axes. In more detail, when the monitoring system at the monitored property is armed, the control unit at the monitored property communicates the armed status data to the monitoring server. Based on the monitoring server receiving data that the monitoring system is armed, the monitoring server may decrease the motion tolerance value for the x, y, and z axes. In some implementations, the monitoring server may adjust the motion tolerance based on crime data received from an external server. In these implementations, the monitoring server may use an algorithm that utilizes factors such as the crime data for the location of the monitored property, along with the wind and rain speed data to determine a motion tolerance. The monitoring server may decrease the motion tolerance when the crime data indicates that a burglary has occurred within a threshold distance of the monitored property within a threshold period of time.

The monitoring server receives motion data that indicates motion of the item (530). The control unit at the monitoring property may receive motion data from a motion beacon attached to the item and communicates the detected motion to the monitoring server. The motion data may include data that identifies the particular beacon that communicated the data. The monitoring server may compare received accelerometer data to the stored baseline accelerometer values of the identified motion beacon to determine whether motion occurred. The monitoring server compares the motion data to the motion tolerance (540). The monitoring server compares the baseline accelerometer values of each of the x, y, and z axes to the adjusted motion tolerance values for the x, y and z axes. For example, the baseline accelerometer values for a motion beacon may be 1.0 for the x axis, 0.25 for the y axis, and 0.75 for the z axis, the tolerance threshold values for the x axis may be +/−0.17, the y axis may be +/−. 05, the z axis may be +/−0.60, based on the weather data, the motion tolerance values may be adjusted to +/−0.67 for the x axis, +/−0.25 for the y axis, and +/−0.90 for the z axis.

The monitoring server determines whether to generate a monitoring system event based on comparing the motion data to the motion tolerance (550). When the motion data does not exceed the motion tolerance, the monitoring server determines that the weather conditions caused the movement of the item. When the motion data exceeds the motion tolerance, the monitoring server determines that a force other than the weather conditions likely caused the movement of the item. In some implementations, the monitoring server determines that a force other than the weather conditions likely caused movement of the item when the accelerometer data for at least one axis exceeds the adjusted tolerance value. In other implementations, the monitoring server determines that a force other than the weather conditions likely caused movement of the item when the accelerometer data for each of the axes exceeds the respective adjusted motion tolerance values.

The monitoring server performs the monitoring system event (560). The monitoring server performs the monitoring system event based on determining that the motion data exceeds the motion tolerance. In some examples, the monitoring server communicates a notification to a user device of a resident of the monitored property indicating that a force other than the weather conditions likely caused movement of the item. For example, the monitoring server sends a text message or in-app message to the user indicating a force other than the weather conditions likely caused the movement of the item. In some implementations, the notification communicated to the user device of the resident of the property includes a control that when selected by the user, allows the user to review a video captured by a camera at the property. In these implementations, when the monitoring server determines that the motion data exceeds the motion tolerance, the monitoring server commands the control unit at the monitored property to capture video data of the item to which the motion beacon is attached. The control unit at the monitored property initiates the capture of video of the item, and communicates the captured video data to the monitoring server. The user may review the video data to determine what was the cause of the movement of the item. When the user determines that the movement was caused by a known person moving the item, the user may take no further action. When the user determines that the movement was caused by an unknown person moving the item, the user assumes the item is being stolen, and may select a control that causes the monitoring server to sound an audible alarm and to dispatch authorities to the property. When the user determines that the weather conditions caused the movement of the item, the user may select a control that causes the monitoring server to increase the motion tolerance. In some implementations, the control unit communicates the notification to the user device of the resident of the monitored property.

In other examples, the monitoring server commands the control unit at the monitored property to sound an audible alarm at the property based on determining a force other than the weather conditions caused the movement of the item. The monitoring server may determine whether to send a notification to the user or to sound an alarm at the property based on preferences set by the user. The user may log into a monitoring application that runs on the user's mobile device, and that is managed by the monitoring server, to set preferences for the type of monitoring system event that should be generated. For example, the user may wish to receive a notification, to generate an audible alarm, or any other suitable monitoring system event.

In some implementations, the monitoring system event may be generated based on the determined status of the monitoring system. When the monitoring system determines that the motion data received exceeds the motion tolerance, the monitoring server communicates with the control unit at the monitoring property to determine the armed status of the monitoring system. Based on the monitoring system determining that the monitoring system is armed away, the monitoring system commands the control unit to sound an audible alarm at the monitored property. In some implementations, the monitoring system communicates with an external server to dispatch personnel to the monitored property. When the monitoring system determines that the motion data received exceeds the motion tolerance, and the monitoring system is armed stay, the monitoring system may generate a notification to a resident indicating that a force other than the weather conditions likely caused the movement of the item.

In some implementations, the monitoring server may utilize sensor data received from one or more other sensors at the monitored property to determine how to respond to the movement of an item that was caused by a force other than weather. For example, the control unit at the monitored property may receive sensor data from a contact sensor on a backdoor at the property that indicates the backdoor has been opened, followed by receiving motion data that indicates a patio table has moved. The monitoring server may determine that the movement was caused by a force other than weather, and based on the sensor data received from the contact sensor, may determine not to generate an alert based on assuming that the resident of the property moved the furniture. The monitoring server may communicate with the control unit to command one or more cameras in the area near the patio table to begin to capture video data. The monitoring server may confirm its determination not to generate an alert based on the video data confirming that a known person moved the table.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A monitoring system for determining whether an item located at an outdoor location of a property is being moved, the system comprising:
   one or more sensors that are located throughout the property, at least one of the one or more sensors being a motion beacon that is connected to the item that is located at the outdoor location of the property; and
   a monitoring control unit that is configured to:
   receive weather data that corresponds to at least one weather condition at the property;
   based on the received weather data, determine a motion tolerance that corresponds to the at least one weather condition, for determining whether a force other than weather caused a movement of the item;
   receive, from the motion beacon, motion data that indicates motion of the item;
   compare the motion data to the motion tolerance;
   based on comparing the motion data to the motion tolerance, determine that the motion data satisfies the motion tolerance; and
   based on determining that the motion data satisfies the motion tolerance, performing a monitoring system event indicating that the force other than the weather caused the movement of the item, wherein the monitoring system event comprises sending a notification to a client device of a resident of the property indicating that the item is being moved.

2. The system of claim 1, wherein the monitoring control unit is configured to:
   receive the weather data that corresponds to the at least one weather condition at the property by receiving wind speed data for the location; and
   determine the motion tolerance for determining whether the force other than weather caused the movement of the item by determining the motion tolerance based on the wind speed data.

3. The system of claim 1, wherein the monitoring control unit is configured to:
   receive the weather data that corresponds to the at least one weather condition at the location by receiving rain data for the location; and
   determine the motion tolerance for determining whether the force other than the weather caused the movement of the item by determining the motion tolerance based on the rain data.

4. The system of claim 1, wherein the monitoring control unit is configured to:
   determine that the monitoring system is armed status; and
   based on determining that the monitoring system is the armed status, decrease the motion tolerance;
   compare the motion data to the motion tolerance by comparing the motion data to the decreased motion tolerance;
   based on comparing the motion data to the decreased motion tolerance, determine that the motion data satisfies the decreased motion tolerance; and
   based on determining that the motion data satisfies the decreased motion tolerance, performing a monitoring system event.

5. The system of claim 1, wherein the monitoring control unit is further configured to:
   perform the monitoring system event indicating that the force other than the weather caused the movement of the item based on determining that the motion data satisfies the motion tolerance by generating an audible alarm at the property.

6. The system of claim 1, comprising:
one or more cameras located throughout the property, wherein the monitoring control unit is configured to:
perform the monitoring system event indicating that the force other than the weather caused the movement of the item based on determining that the motion data satisfies the motion tolerance by:
activating the one of the one or more cameras that includes the item in a field of view of the one of the one or more cameras; and
generating the notification that indicates that the force other than the weather caused the movement of the item and that includes a control to view a video captured by the one or more cameras; and
providing, to the client device of the resident of the property, the notification that indicates that the force other than the weather caused the movement of the item and that includes the control to view the video captured by the one of the one or more cameras.

7. The system of claim 6, wherein the monitoring control unit is configured to: receive, from the client device, data indicating a selection of the control indicating that the weather caused the movement of the item; and
in response to receiving the data indicating the selection of the control indicating that the at least one weather condition caused the movement of the item, increase the motion tolerance.

8. The system of claim 1, wherein the monitoring control unit is further configured to:
receive, from an additional motion beacon of the one or more sensors that is attached to an additional item that is located at the property, additional motion data that indicates motion of the additional item;
compare the motion data to the additional motion data;
based on comparing the motion data to the additional motion data, determine that a difference between the motion data and the additional motion data satisfies a motion difference tolerance;
determine whether to generate the monitoring system event indicating that the force other than the weather caused the movement of the item by generating a notification that indicates that the force other than the weather caused the movement of the item; and
perform the monitoring system event indicating that a force other than the weather caused the movement of the item by providing, to the client device of the resident of the property, the notification that indicates that the force other than the weather caused the movement of the item.

9. The system of claim 1, wherein the monitoring control unit is configured to:
receive, from the client device of the resident of the property, data indicating a time period during which the force other than the weather caused the movement of the item;
receive additional motion data collected during the time period;
receive data indicating at least one previous weather condition that occurred during the time period; and
based on the additional motion data collected during the time period and the at least one previous weather condition that occurred during the time period, generate the motion tolerance that corresponds to the at least one previous weather condition.

10. The system of claim 1, wherein the monitoring control unit is configured to:
receive motion data that indicates motion of the item by:
receiving accelerometer data from an accelerometer included in the motion beacon;
receiving gyroscope data from a gyroscope included in the motion beacon;
receiving magnetometer data from a magnetometer included in the motion beacon; and
receiving gravity sensor data from a gravity sensor included in the motion beacon; and
compare the motion data to the motion tolerance by:
generating a motion score based on the accelerometer data, the gyroscope data, the magnetometer data, and the gravity sensor data; and
comparing the motion score to the motion tolerance.

11. The system of claim 1, wherein the monitoring control unit is configured to:
receive motion data that indicates motion of the item by:
receiving accelerometer data from an accelerometer included in the motion beacon;
receiving gyroscope data from a gyroscope included in the motion beacon;
receiving magnetometer data from a magnetometer included in the motion beacon; and
receiving gravity sensor data from a gravity sensor included in the motion beacon; and
compare the motion data to the motion tolerance by:
comparing the accelerometer data to an accelerometer tolerance;
comparing the gyroscope data to a gyroscope tolerance;
comparing the magnetometer data to a magnetometer tolerance; and
comparing the gravity sensor data to a gravity sensor tolerance.

12. The system of claim 1, wherein the monitoring control unit is configured to:
receive motion data that indicates motion of the item by:
receiving the motion data that indicates motion in three-dimensional space;
compare the motion data to the motion tolerance by:
comparing the motion data for each dimension of the three-dimensional space to a respective motion tolerance for the dimension.

13. The system of claim 1, wherein the monitor control unit is configured to:
receive, from the one or more sensors other than the motion beacon, sensor data; and
adjust the motion tolerance for determining whether the force other than the weather caused the movement of the item based on the sensor data.

14. The system of claim 13, wherein the monitor control unit is configured to: receive, from the one or more sensors other than the motion beacon, sensor data by
receiving the sensor data indicating that a person exits an exterior door of the property;
adjust, for a predetermined period of time, the motion tolerance for determining whether the force other than the weather caused the movement of the item based on the sensor data indicating that the person exists the exterior door of the property by increasing the motion tolerance; and
after the predetermined period of time has elapsed, adjust the motion tolerance for determining whether the force other than weather caused the movement of the item by adjusting the motion tolerance to a value before the predetermined period of time.

15. The system of claim 13, wherein the monitor control unit is configured to:
- receive, from the one or more sensors other than the motion beacon, sensor data by
- receiving sensor data indicating an estimated number of people at the property exceeds a threshold;
- adjust the motion tolerance for determining whether the force other than the weather caused the movement of the item based on the sensor data indicating the estimated number of people at the property exceeds the threshold by increasing the motion tolerance;
- after adjusting the motion tolerance, receive, from the one or more sensors other than the motion beacon, additional sensor data indicating the estimated number of people at the property no longer exceeds the threshold; and
- based on the additional sensor data indicating the estimated number of people at the property no longer exceeds the threshold, adjust the motion tolerance to a value before receiving the sensor data indicating the estimated number of people at the property exceeds the threshold.

16. A computer-implemented method for determining whether an item located at an outdoor location of a property is being moved comprising:
- receiving, by a monitoring control unit of a monitoring system, weather data that corresponds to at least one weather condition at the location where the monitoring system monitors the item that is located at the outdoor location of the property and that includes a motion beacon;
- based on the received weather data, determining, by the monitoring control unit, a motion tolerance that corresponds to the at least one weather condition for determining whether a force other than weather caused a movement of the item;
- receiving, by the monitoring control unit, from the motion beacon, motion data that indicates motion of the item;
- comparing, by the monitoring control unit, the motion data to the motion tolerance;
- based on comparing the motion data to the motion tolerance, determining, by the monitoring control unit, that the motion data satisfies the motion tolerance; and
- based on determining that the motion data satisfies the motion tolerance, performing the monitoring system event indicating that the force other than the weather caused the movement of the item; the monitoring system event comprises sending a notification to a client device of a resident of the property to indicate the item is being moved.

* * * * *

UNITED STATES PATENT AND TRADEMARK OFFICE
CERTIFICATE OF CORRECTION

PATENT NO. : 10,096,219 B1
APPLICATION NO. : 15/836168
DATED : October 9, 2018
INVENTOR(S) : Kevin Maurer and Alison Jane Slavin Page 1 of 1

It is certified that error appears in the above-identified patent and that said Letters Patent is hereby corrected as shown below:

In the Claims

In Claim 14, Column 24, Line 60, delete "exists" and insert -- exits --, therefor.

Signed and Sealed this
Fourth Day of December, 2018

Andrei Iancu
*Director of the United States Patent and Trademark Office*